J. AYRES & A. C. DECKER.
MACHINE FOR BARBING WIRE.
No. 253,660. Patented Feb. 14, 1882.
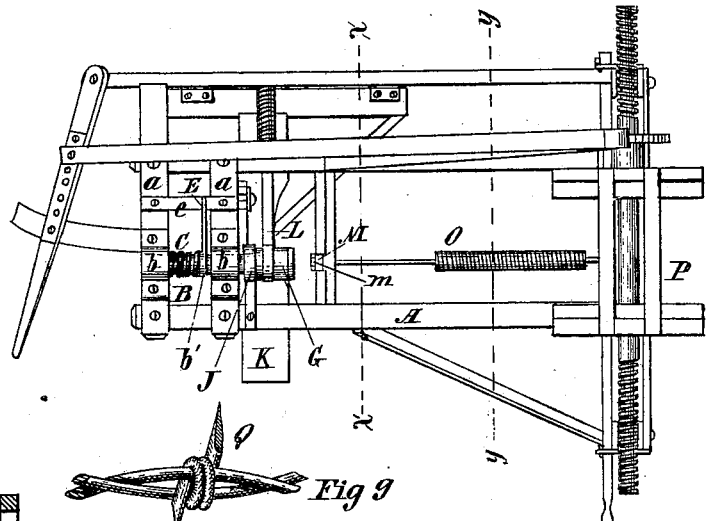
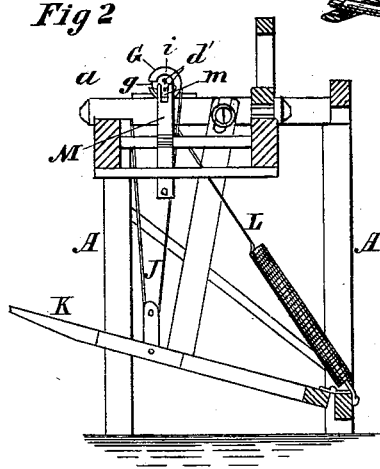
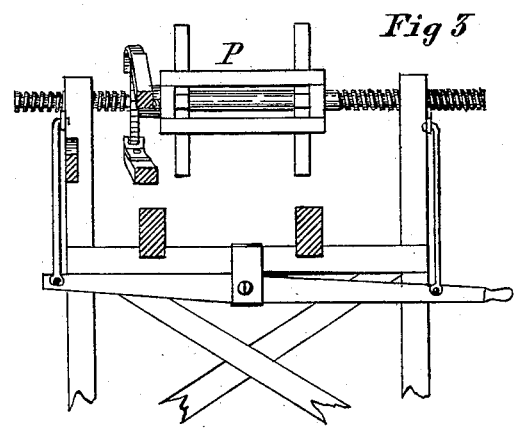
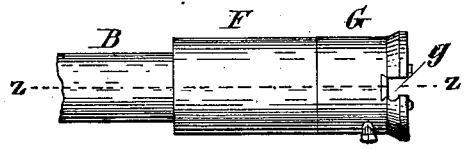
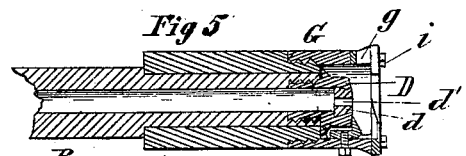
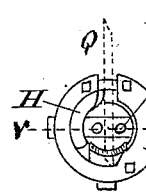
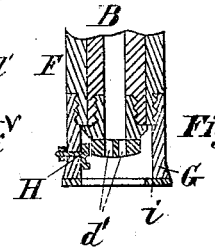
Witnesses
Inventors
James Ayres and
Alexander C. Decker
By Coburn Thacher
Attorneys

UNITED STATES PATENT OFFICE.

JAMES AYRES AND ALEXANDER C. DECKER, OF BUSHNELL, ILLINOIS, ASSIGNORS TO WASHBURN & MOEN MANUFACTURING COMPANY, OF WORCESTER, MASSACHUSETTS.

MACHINE FOR BARBING WIRE.

SPECIFICATION forming part of Letters Patent No. 253,660, dated February 14, 1882.

Application filed June 14, 1879.

*To all whom it may concern:*

Be it known that we, JAMES AYRES and ALEXANDER C. DECKER, of Bushnell, in the county of McDonough and State of Illinois, have invented certain new and useful Improvements in Machines for Barbing Wire, which are fully described in the following specification, reference being had to the accompanying drawings, in which—

Figure 1 represents a plan view of a machine embodying our improvements; Fig. 2, a transverse section taken on the line $x\,x$, Fig. 1; Fig. 3, a similar section taken on the line $y\,y$, Fig. 1, and looking toward the wire end of the machine; Fig. 4, an elevation, on an enlarged scale, of the coiling device; Fig. 5, a longitudinal section of the same, taken on the line $z\,z$, Fig. 4; Fig. 6, an end elevation of the same; Fig. 7, a longitudinal section taken on the line $v\,v$, Fig. 6; Fig. 8, detail views of the detachable tip of the wire-holder, and Fig. 9 a section of completed wire with the barb attached, showing the style of barb made by this machine.

Our present invention relates to a machine for putting upon the wires what has generally been known in barb-fence wire as the "lock-stitch" or "interlooped" barb, in which the barb is coiled around two main wires, one end thereof being held between the main wires.

The invention consists in special mechanism and combinations of devices, all of which will be hereinafter fully described, and will be definitely pointed out in the claims.

In the drawings, A represents the main or supporting frame, which is of suitable form and construction to provide for the attachment and support of the several operating devices. At one end of this frame are two cross-bars, $a$, attached to the top of the frame, on which is mounted a cylindrical tube, B. This tube is to receive and hold the two main wires, which are fed from spools which are mounted either on an extension of the main frame A or upon independent supports, as may be convenient. It is not necessary to show them here. This tubular holder is mounted in suitable bearings, $b$, in which it may be oscillated and also moved longitudinally, a collar, $b'$, being provided between the bearings to limit the sliding movement of the tube. A spring, C, is coiled around the tube between its bearings, which acts to thrust the tube outward to its fullest extent, unless compressed by some superior force. At the inner end of the tube there is a tip, D, which is attached to the former by means of screw-threads, and is provided with a steel die, $d$, attached to the outer end of the tube by a dovetailed joint, so as to be easily removed therefrom. This die is provided with two holes, $d'$, one for each of the main wires passing through the tube. The tubular holder is also provided with an arm, E, projecting at one side thereof, which rests upon a bar, $e$, on the frame inside of the tube, and thereby forms a stop to prevent the rotation of the tube during the operation of coiling the barb. This device is also made slightly adjustable, so as to provide for any wear in the die at the end of the tube, which must always be held in such position that the holes therein will stand one above the other during the operation of fastening the barb, as shown in Fig. 8 of the drawings.

The inner end of the tube B is turned down slightly, so as to form a bearing for a tubular shell, F, which is mounted loosely on the said tubular wire-holder, and is held in position by the tip thereof, the head of which is made a little larger than the end of the tube, so as to constitute a holding nut, as shown in Fig. 5 of the drawings.

The outer end of the tube F is threaded to provide for the attachment of a shell, G, which is screwed to this end of the tube F, the parts being constructed so as to be flush when attached. This shell projects over and incloses the tip of the wire-holder, and has a notch, $g$, cut in its outer edge on one side extending in about even with the tip. A lip or lug, H, is fitted to the interior of this shell, to which it is secured below the notch therein, the upper end of the lug being designed to reach to and about flush with the lower edge of the notch. This lip is made adjustable by being attached to the shell by slot and set-screw, so that as the upper end is worn off it may be adjusted to compensate therefor.

A face-plate, I, is attached to the outer end of the shell G, being notched to correspond with the notch in the latter. This plate, for most of the distance around, is of the same width as the thickness of the shell G, but that portion above the notch in the latter is made somewhat wider, so as to provide a flange, *i*, projecting inward slightly beyond the edge of the shell. A band or strap, J, is wound at one end around the cylinder F, and at the other end connected to a treadle, K, so that the depression of the latter will rotate the cylinder F, and sufficient motion is provided for the treadle K to give the cylinder two revolutions. An elastic retracting strap or band, L, is also attached to the cylinder, and is arranged to operate in the usual way to turn the cylinder back again after it has been operated by the treadle.

An upright support, M, is arranged just in front of the shell G, being provided with a notch, *m*, at its upper end to receive and support the wires outside of the barbing mechanism, so as to give them the required rigidity during the operation of barbing. This rest is mounted on a pivotal support, N, attached to the frame of the machine, and its lower end, below the pivotal support, is connected to a spring, O, which permits the rest to swing backward and downward against the pressure of the barb on the wires when the latter are wound upon the reel, but will bring the rest in position again as soon as the barb has passed over it.

This machine is also provided with a reel, P, on which the wire is wound after barbing; and it is also provided with devices for giving the wire-holder travel, and for rotating the same at particular intervals and holding it in position when at rest, all of which, however, have been described and shown and claimed in another application filed by us, of even date herewith, and therefore constitute no part of our present application.

The operation of this machine is as follows: The parts are arranged to stand at rest in the position shown in Fig. 2 of the drawings— that is to say, the notch in the shell toward the front of the machine and about opposite the two wire-holes in the die at the end of the tube B, which, as already stated, should be directly in line one above the other. The two main wires are drawn through the tube, one being passed through each of the holes in the die, and will therefore stand one above the other, and outside of the tube will be supported by the rest M. The barbs Q, before coiling, are straight pieces of wire cut on a bevel, so as to provide suitable points. One of these straight pieces is inserted in the notch of the shell G and passed in between the main wires within the shell until its end strikes the opposite inside face of the shell, the latter being of such size that it also constitutes the proper gage for the length of the barb. The barb should lie in a slightly-inclined position in the shell, so that its inner end will rest as near the outer edge of the shell as possible. The treadle is now depressed, thereby rotating the cylinder and shell; and it is evident that the inner end of the barb will be held firmly between the two main wires, while the outer portion will be coiled around said wires, two coils thereof being made by the two revolutions of the shell, thereby forming a barb like that shown in Fig. 9 of the drawings, one end of which is locked between the two main wires. When the bending or coiling of the barb is first commenced there will sometimes be a tendency to throw the inner end of the barb outside of the shell, which is prevented, however, by the flange *i* on the face-plate, which comes down just outside of the end of the barb as soon as the rotation of the shell is commenced. The shell and wire-holder on which it is mounted move longitudinally a little during the operation of coiling as the barb is wrapped, one coil after another, side by side around the main wires, otherwise the coils would be one above the other. When the coiling is completed the treadle is released, and at the same time the reel is turned to wind the wire thereon and feed it forward for a new barb. The retracting-strap will at the same time turn back the cylinder and shell, a stop being provided, however, to limit the upward vibration of the treadle, so as to stop the cylinder at the proper point.

In order to always secure the inclined position of the barb in the shell which has been mentioned above, a bevel-faced lug may be attached to the inside of the shell opposite to the notch *g*, which will act to throw the end of the barb outward. Such a lug is shown at H', Fig. 5.

Instead of the mechanism above described for giving motion to the coiling-cylinder, any other suitable mechanism may be employed, and, in fact, mechanism may be used which will revolve the cylinder in one direction only, and then, with suitable mechanism for feeding the barbed wire to the machine and cutting the barbs, this machine may be made entirely automatic in its operation. Devices for accomplishing these results are well known and can be readily attached to this machine. Some modifications may be made in the details of construction of this machine, and we do not therefore limit ourselves in all particulars to the specific construction of all the devices as herein shown and described.

Having thus described our invention, what we claim as new, and desire to secure by Letters Patent, is—

1. The combination of the non-rotating holder for the main wires, the coiler, and the spring, the said parts being connected and arranged as explained, so that in operation the said holder and coiler are capable together of endwise movement against the pressure of said spring, substantially as described.

2. In a machine for barbing fence-wire, a tubular wire-holder, B, provided with holes at its tip end for two main wires, in combination with the coiling-shell G, mounted loosely on the wire-holder, about which it is arranged to revolve, and projecting over the tip end of the holder, substantially as described.

3. The tubular wire-holder B, in combination with the detachable tip D and the removable holding-die d, substantially as described.

4. The coiling-shell G, provided with a notch, g, in combination with the adjustable lug H and the wire-holding tube B, substantially as described.

5. The face-plate I on the end of the coiling-shell, widened on one side to provide a flange, i, to hold the inner end of the barb, substantially as described.

6. The cylinder F, mounted on the wire-holder B, in combination with the detachable coiling-shell G, substantially as described.

7. The coiling-shell G, in combination with the wire-holder B, and the pivoted wire-support M, substantially as described.

JAMES AYRES.
ALEXANDER C. DECKER.

Witnesses:
JOSEPH B. McCONNELL,
GEORGE W. FOX.